United States Patent [19]

Kopp, Jr.

[11] 4,062,735
[45] Dec. 13, 1977

[54] METHOD OF RECOVERING FRESH WATER FROM SALINE WATER

[76] Inventor: Adolph Kopp, Jr., P.O. Box 137, Swan Lake, Mont. 59911

[21] Appl. No.: 393,437

[22] Filed: Aug. 31, 1973

[51] Int. Cl.² .......................... B01D 3/06; B01D 5/00
[52] U.S. Cl. ........................................ 203/10; 203/50; 203/87; 159/1 G
[58] Field of Search ..................... 203/10, 11, 100, 12, 203/14, 57, 67, 50, 87; 159/1 G; 60/641; 166/314

[56] References Cited
U.S. PATENT DOCUMENTS

| 3,140,986 | 7/1964 | Hubbard | 203/100 X |
| 3,274,769 | 9/1966 | Reynolds | 60/641 |
| 3,470,943 | 10/1969 | Van Huisen | 203/100 UX |

FOREIGN PATENT DOCUMENTS

| 498,700 | 5/1930 | Germany | 203/100 |

OTHER PUBLICATIONS

Scientific American, vol. CXVII, No. 17, 10/27/1917.

Primary Examiner—Hiram H. Bernstein
Attorney, Agent, or Firm—Wells, St. John & Roberts

[57] ABSTRACT

A method of recovering fresh water from underground saline water. The method involves the pumping of water vapor from an underground location immediately above a supply of saline water to a condenser where the fresh water is recovered. The heat of condensation released by the vapor during recovery is returned to the underground saline water to raise its temperature and thereby increase its rate of vaporization. Other alternative processes to increase the rate of vaporization include utilization of an external source of waste thermal energy, injection of refrigerant into the underground saline water, and in those structures where petroleum residues may be simultaneously and profitably recovered with the fresh water, the injection of refrigerants soluble in petroleum into the underground saline water.

4 Claims, 2 Drawing Figures

METHOD OF RECOVERING FRESH WATER FROM SALINE WATER

BACKGROUND OF THE INVENTION

This disclosure relates generally to the recovery or distillation of fresh water from salt water. While many previous arrangements have been proposed and used to distill salt water for desalinization purposes, these typically require direct processing of seawater or salt water, which is treated in a heat exchanger in conjunction with a condensing surface for collecting the evaporated fresh water. The residual brine or salt deposits must then be returned to the sea or otherwise disposed of.

The present method utilizes an underground natural geological structure as a "reactor vessel" in which vaporization occurs. The necessity of handling salt water as a vapor source, and of handling brine is completely eliminated and only water vapor enters the mechanical apparatus for condensing fresh water. By combining natural underground containment of salt water and a large supply of water vapor, the present method makes practical the recovery of fresh water on a large scale.

It is recognized that solar stills such as shown in U.S. Pat. Nos. 3,138,546 and 3,468,762 utilize the general concept of evaporating seawater within a chamber and drawing off the vapor for condensation recovery. However, these prior disclosures described such processes utilizing only manmade vessels and therefore must also involve the handling of the resulting waste products. U.S. Pat. No. 2,716,446 describes evaporation of water in a manmade container by reduction of pressure. U.S. Pat. No. 3,283,813 describes salt water conversion in a sub-surface chamber, using an osmosis process.

The present invention makes use of the natural containment of salt water or seawater available in areas adjacent to a sea coast, where salt water is occasionally found in an underground chamber capped by an impervious cover layer, and more commonly where salt water is found in sand and gravel filled water permeable strata capped by impervious cover layers and forming with appropriate "closure" what are commonly called in the petroleum industry, domelike, anticlinal, monoclinal, and similar "structures;" which "structures" are sought as potential traps for petroleum and natural gas if there is also present a petroleum source rock and a water "drive."

The underground body of water should be sufficiently large so that its area and the effective rate of evaporation is virtually unaffected by any local channels having an increased concentration of salt in solution being carried down structure to sea water dispersal or deep disposal; and said underground body of water should have offshore communication with a body of seawater to permit replenishing with salt water the discharged cooler, more dense waste brine as the brine sinks and travels upon and along impermeable shale stratum 19, FIG. 1, which stratum is shown dipping largely seaward. (The temperature and brine density result from evaporational effects accomplished by appropriate placement of the family of vapor outlet pipes represented by 15, FIG. 1). The dense discharged brine would tend to be simultaneously replaced by the less saline, less dense, warmer seawater, along the highest points of seawater access to the stratum 12; especially along directions and through the higher channels in the gravel zones not being used for the discharge of the heavier brines tending to seek the lowest level of hydraulic access to the sea.

Nearness to the sea would frequently allow the low cost use of seawater to cool the condensing equipment and by injecting to the underground structure the warm discharge water from the condensers, both the heat of condensation can be recovered usefully, and the injected seawater may also replace the fresh water produced and the brine discharged from the structure.

The method eliminates direct handling or manipulation of salt brine or salt deposits; and the moderate temperatures, pressures, and conditions of operation used by the method generally avoid many problems that beset other desalinization or distillation systems such as, the corrosion of equipment, the accumulation of saline residues, and the relatively expensive maintenance of equipment operating at higher temperatures or abnormal pressures.

The gravel exposures along the offshore ocean bottom generally would form wise, three dimensional, undersea brine dispersal zones for the natural redilution of the waste brines. Ecologically these redilution zones may be selected and managed so as to compare favorably with many natural redilution process taking place in coastal bays where increased salinity results from evaporation, as well as to compare favorably with many man managed systems that seek to protect the shoreline environment from excessive saline accumulations.

Appropriate structures for the application of the invention may be selected from the wide variety of nonproductive structures already mapped by the petroleum industry, and from the maps of structural geology published by various governmental professional and educational entities.

SUMMARY OF THE INVENTION

The method disclosed herein essentially relates to the recovery of fresh water from a body of saline water whose upper portion is entrapped from horizontal escape and lies within and partially fills a very permeable portion of an underground geological structure having an impervious cover layer. Water vapor is pumped from a location within the underground geological structure and condensed by mechanical processes. The released head of condensation is preferably directed back to the saline water to increase the rate of vaporization within the underground geological structure.

A first object of this invention is to segregate the vaporization and condensation of seawater in a fresh water recovery process by utilizing a natural underground chamber as a vaporization reactor.

Another object of this invention is to provide a practical desalinization process wherein mechanical handling of brine or resulting salt deposits is completely eliminated.

Another object of the invention is to provide an effective large scale process for producing fresh water from saline water naturally occurring in underground geological structures.

Another object of the invention is to make usefully available to man from the appropriate geological structures all energy values that may be obtained as by-products or co-products of the process while enhancing the overall practical value of the invention.

These and further objects will be evident from the following disclosure, taken together with the accompanying drawings which schematically illustrate the features and devices used in carrying out the method. It is to be understood that the disclosure and drawings are provided only by way of illustration and that modifications can be made within the scope of the disclosure.

DESCRIPTION OF THE PREFERRED EMBODIMENT

Figure 1:
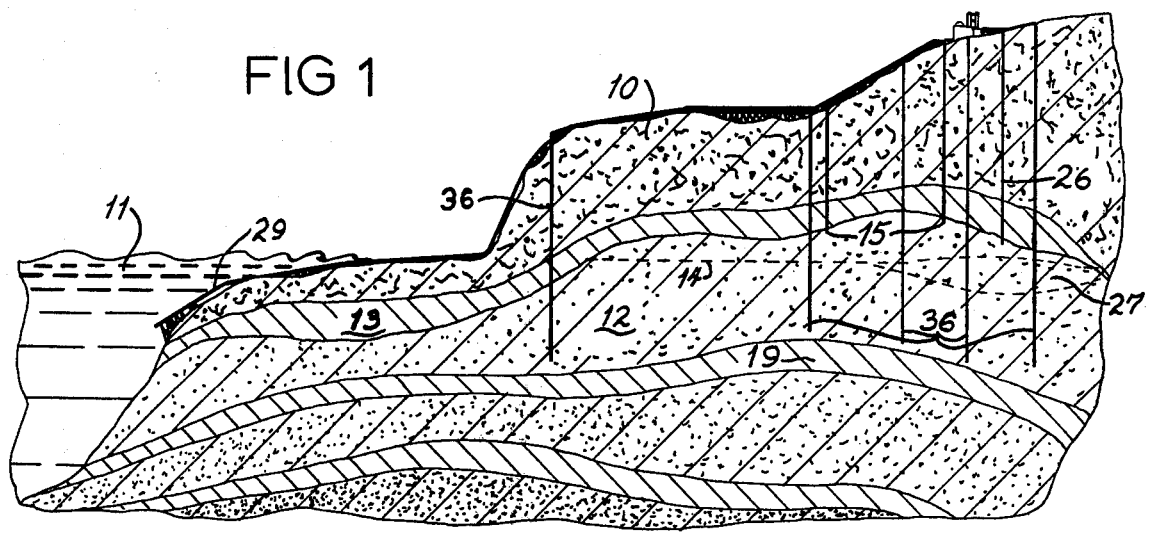
FIG. 1 is a schematic elevation view showing the general type of geological formation at which the method is used.

FIG. 1 generally illustrates the environment in which the present method has application. It normally would be applied to areas along a sea coast, typically presenting a surface shelf of land 10 projecting outwardly into a body of seawater 11. The adjacent seawater can constitute any large saline water source, such as an ocean, or inland tidal waters, whose salinity would be consistently less than the brine discharged from the underground vaporization structure described below. The area chosen for this system preferably includes a gravel stratum 12 located between two impermeable shale layers 13, 19. The gravel stratum 12 is in direct or indirect hydraulic communication with the body of seawater 11. The impermeable shale stratum 13 caps an underground dome or chamber containing the gravel straum. It is impermeable to vapor and water and is the type of stratum commonly found to be the effective member trapping gas and petroleum within dome or other suitable geological structures. Such a shale stratum is capable of holding trapped natural gas at pressures ranging up to hundreds of pounds per square inch.

The line 14 shown in FIG. 1 designates the saline groundwater level, which will normally also constitute the average elevation of the seawater 11 in the given case. This level will vary with vapor pressure changes under the geological dome and with daily tidal fluctuations. The material between the cover layer 13 and layer 19 is gravel. The gravel beneath line 14 is submerged in saline water. The gravel above line 14 is wetted by the saline water and surrounded by water vapor.

Figure 2:
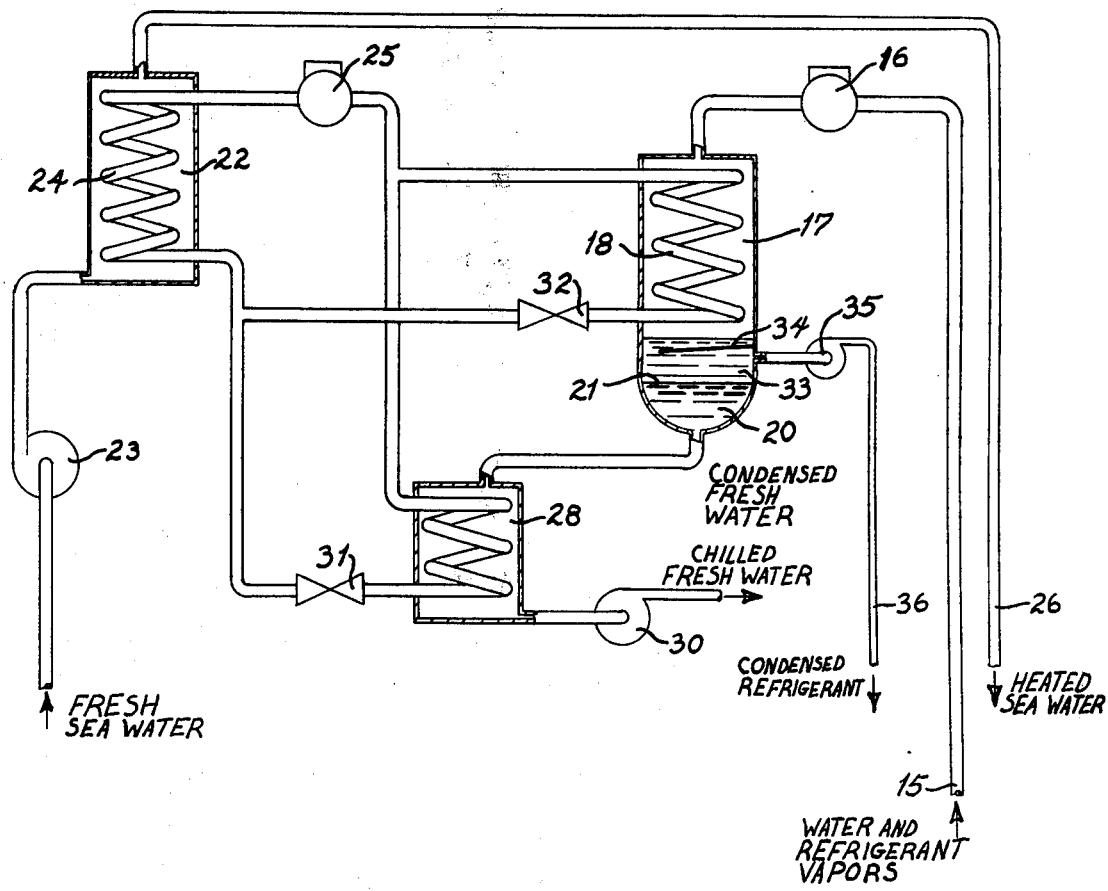
FIG. 2 is a schematic flow diagram of the mechanical system for utilizing the method.

The basic purpose of the present method is to remove water vapor from the area between line 14 and cover layer 13. Since this water vapor is free of salt, it can be condensed in an installation at the ground surface for use as fresh water. The structure schematically shown in FIG. 2 is designed specifically for this purpose.

The basic conduit connections to the underground geological structure comprise outlet pipes 15 which terminate in the area between the water surface line 14 and the cover layer 13. The pipes 15 lead to a compresser 16 which pumps water vapor from the underground structure and compresses the vapor as it is directed to the interior of a vapor condenser 17. The compressed water vapor is condensed on the cool surfaces of a refrigerant coil 18 within condenser 17. The condensed water flows or drips to the base of condenser 17, and is shown in FIG. 2 at 20. The line 21 in FIG. 2 indicates the water level surface within condenser 17.

The above structure constitutes the basic arrangement of the invention. The method comprises the removal of water vapor from a location within the underground structure at an elevation above the liquid surface elevation of the underground saline water and below the elevation of an impervious cover layer and subsequent condensation of the water vapor to recover the fresh water. No saline water as "raw material" or water vapor source is pumped to the surface equipment. The increase in salinity in the underground body of saline water may be controlled by appropriate placement of the family of vapor withdrawal wells represented by outlet pipes 15, causing increasing salinity in the direction of desired brine cooling, sinking, and discharge.

In conjunction with directionally controlled discharge of the brine, natural replenishment with seawater can be accomplished by seawater having access to the gravel stratum 12 along and beneath the higher portions of the impermeable shale stratum 13 from directions other than the discharge direction, and generally higher than the zone of discharge. In addition, replenishment of the structure with seawater supplies could be accomplished through natural (erosional) breaches, or through dredged breaches in the otherwise impermeable shale cover 13. Hydraulic communication of the underground body of water with the seawater 11 is appropriately shown in FIG. 1 only along the one line in the schematic vertical section; however, in the nearby locale, on either side of the depicted section, hydraulic communication or breaches in the impermeable shale 13 could provide the appropriate access of seawater to the structure for replenishment without the necessity of pumping these supplies.

To more efficiently utilize the surface equipment and increase the production of fresh water, various methods can be employed to increase the rate of vaporization of the saline water. One such method involves the addition of heated salt water to the underground body of salt water, thereby raising the surface temperature of the underground water and also providing new quantities of seawater for dilution of the salt content in the underground water. Since the water recovered from the water vapor must give off considerable heat as it is condensed, this heat can be transferred to seawater for injection underground. As shown in FIG. 2, a supply of fresh seawater is directed to a refrigerant condenser 22 through conduit 29 by means of a delivery pump 23. Heat is exchanged between the refrigerant coils 24 within condenser 22 and the seawater that fills the condenser vessel. Refrigerant is supplied to coil 24 by means of a compresser 25.

The warmed seawater exits through conduit 26 which discharges the water in the underground geological structure at an elevation approximating the elevation of the water surface shown at 14. The incoming heated water forms a "lens" of warmer saline water shown in FIG. 1 at 27. This floating lens of water vaporizes at a rate greater than the normal vaporization rate of the cooler salt water naturally occurring in such an underground structure. Therefore, the heat of condensation from the condensing of the water vapor drawn from the underground structure is utilized to heat incoming seawater which in turn increases the vaporization rate in the underground structure.

To provide further heat transfer, refrigerant may be directed to a chiller 28 which cools the condensed water 20 prior to discharge by pump 30 to storage facilitates of the water user (not shown). The heat absorbed by the refrigerant during the process of chilling water 20 is also transferred to the seawater in condenser 22. Conventional expansion valves 31 and 32 are interposed between condenser 22 and the chiller 28 and condenser 17, respectively.

Another method of increasing vaporization involves the use of a refrigerant liquid that is lighter than water and is injected into the underground saline water from the ground surface. As the refrigerant vaporizes and rises through the saline water, the water is agitated and water vapor is entrapped in the bubbles of refrigerant. The vaporized refrigerant and water vapor is then drawn through conduits 15 and recovered in the condenser 17. The drawings shown the recovered and condensed refrigerant at 33. A diverting baffle 34 protects the refrigerant discharge to the pump 35 that injects the liquified refrigerant to the underground structure through a series of pipes 36. The injected refrigerant is recycled continuously, being injected through pipes 36 and removed through conduits 15. Again, the heat of condensation from the injected refrigerant is recovered in the cooling refrigerant coils and transferred to the warmed seawater that is injected through pipe 26.

When desired, additional thermal energy can be supplied to the injected seawater by directing a source of thermal energy to the water in pipe 26. This water can flow through a heat exchanger or boiler prior to its injected below ground. This will be particularly useful where an available source of waste heat can be combined with the water recovery system.

Also in FIG. 1 a deeper gravel stratum similar to 12 and similarly oriented is depicted beneath impermeable shale stratum 19. This deeper stratum could also be utilized as a water vapor source through the use of a refrigerant liquid that is ligher than water and is injected into the underground saline water from the ground surface. In this case by using a refrigerant that maintains a sufficiently high vapor pressure at the given ambient temperature, (and perhaps higher than that used for gravel stratum 12), a meniscus or surface similar to 14, as well as the other characteristics shown within the higher zone 12 may be reproduced and utilized in the deeper zone for the increased production of water vapor from this additional stratum within the domed structure. Similar equipment at the surface to that used with stratum 12 could be adapted for recovery of the additional water from this lower gravel stratum whose domed apex may be fifty feet or more below sea level. Refrigerant vapor upon rising through saline water saturated gravels and contacting the inclined base of an impermeable shale cap 19 shall travel upslope absorbing environmental heat and water vapor as the bubbles enlarge and accumulate in a water vapor-refrigerant vapor zone; so that the vapors accumulating may be drawn through conduits (not shown) to the surface equipment designed to recover water and condense the refrigerant for recycling.

As additional by-product benefits from the invention, it is probable that in exceptional cases not only fresh water but clean heat energy as well as petroleum derivatives may be obtained economically from the same structure either simultaneously or as successive products by adaptation of the equipment to the potential yield from the structure. Toward these ends of increasing the clean heat energy and of recovering significant fractions of otherwise non-economical petroleum residues, the selection of a refrigerant from the hydrocarbon series as Butane or Propane would be appropriate. These refrigerants are readily soluble in petroleum so that after being injected as liquids into a saline water saturated gravel strata such as 12, vaporizing and rising to and along considerable distances of the inclined underslope of the impermeable shale 13, these refrigerants would tend to dissolve in such isolated pockets or lenses of petroleum as were encountered, making these petroleum residues more mobile. Greater mobility would tend to cause undip migration of the petroleum residues toward the vapor zone above the surface designated in FIG. 1 by line 14. Having migrated to zones of lesser pressure, some of the petroleum constituents would tend to vaporize and become co-condensates with the refrigerant and water vapor after the vapor mixture has been withdrawn via outlet pipes 15 by a compressor 16, compressed and directed to the interior of a vapor condenser 17 and condensed on the cool surface of a refrigerant coil 18 within condenser 17; and some of these petroleum constituents would collect as floating liquids upon the surface designated by line 14, FIG. 1. Since efficient equipment for the separation of water vapor from natural gas, propane, butane and other petroleum constituents has been developed; the recovery of fresh water from saline water by the processes outlined may be accompanied by the profitable recovery of petroleum from dispersed petroliferous residues within the same structures.

The present method further takes advantage of the natural heating of underground water; which heat is continually available in deposits below the penetration of seasonal effects at temperatures generally increasing at a rate of about 2° fahrenheit per hundred feet of increasing depth. The method makes possible the recovery of fresh water from the copious available underground supplies of saline water that saturate coastline gravel beds and other permeable layers which are covered by impermeable strata, such as shale and which are typically available within natural underground structures having areas in a magnitude of square miles.

In the typical geological structure shown in FIG. 1, the seawater 11 is in hydraulic continuity with the saline groundwater in the gravel 12, at an offshore location. The flow of ground water toward the sea compensates for the incoming flow of heated salt water through pipe 26 and serves to assure dilution of the underground saline water to maintain a balanced condition of salinity between the sea and the underground water body.

Where the user is not primarily concerned with fresh water production, but is concerned about the availability of clean heat energy, the structure shown in FIG. 1 can be adapted to the recovery of useful thermal energy which by heat pump type equipment may be brought to higher temperatures than the ranges at which it is normally available in shallow structures. In these cases, it is not necessary that the underground saline water be in hydraulic contact with the sea. The general mechanical apparatus shown in FIG. 2 could be used, but the condenser 22 would be coordinated with an appropriate heat pump system so that the heat energy would be raised to the appropriate level for space heating or other heating purposes. The water vapor condensed in condenser 17 would then be returned to the underground structure. If fresh water were needed, both the heat and fresh water could be recovered from such a system.

Changes might be made in the specific equipment and arrangement shown in the drawings and described above. For these reasons, only the following claims are intended to define the scope of my invention.

Having thus described my invention, I claim:
1. A method comprising:
   extending a conduit downward from a ground surface location to an elevation above the surface area of a body of saline water having an upper portion entrapped from horizontal escape and lying within and partially filling a very permeable portion of an underground geological structure having a vapor-impervious cover layer, wherein the body of saline water has offshore communication with a body of seawater and is sufficiently large so that its surface area and the effective rate of evaporation are virtually unaffected by any local channels therein having an increased concentration of salt in solution being carried to seawater dispersal, the conduit being extended to an elevation located beneath the impervious layer and above the surface area of the underground body of saline water;

continuously removing water vapor from beneath the vapor-impervious layer by pumping the water vapor upwardly through the extended conduit to the ground surface location at a rate enabling the resulting dense brine in the underground body of saline water to be simultaneously replaced by the less saline, less dense, warmer seawater due to the access of the underground body of saline water so as to be available in the natural underground geological structure beneath the vapor-impervious cover layer for such continuous removal;

condensing the removal water vapor at the ground surface location;

the continuous removal of water vapor being accompanied by continuous replenishment of the underground body of saline water with the seawater having access to the underground geological structure to assure dilution of the underground body of saline water and to maintain a balanced condition of salinity between it and the body of seawater;

injecting into the underground body of saline water a refrigerant fluid capable of entrapping water vapor as the refrigerant fluid vaporizes and rises through the underground body of saline water, whereby the water is agitated and water vapor is entrapped in the bubbles of refrigerant to increase the resulting rate of water vaporization within the underground geological structure.

2. The method set out in claim 1 further comprising the following steps:

recovering the heat of condensation released by condensing of the water vapor by directly transferring such heat during the condensing of the water vapor to confined seawater;

and injecting the heated seawater into the underground body of saline water through a separate conduit leading downwardly from the ground surface location to the underground geological structure to heat the underground body of saline water and incoming seawater and thereby increase the vaporization rate in the underground geological structure.

3. The method set out in claim 1 further comprising the following steps:

continuously removing the vaporized refrigerant fluid along with the removed water vapor through the extended conduit;

condensing the removed refrigerant vapor;

and recovering the heat of condensation released by the condensing refrigerant vapor.

4. A method of recovering fresh warter and petroleum hydrocarbons, comprising:

extending a conduit downward from a ground surface location to an elevation above the surface area of a body of saline water having an upper portion entrapped from horizontal escape and lying within and partially filling a very permeable portion of an underground geological structure having a vapor-impervious cover layer, wherein the body of saline water has offshore communication with a body of seawater and is sufficiently large so that its surface area and the effective rate of evaporation are virtually unaffected by any local channels therein having an increased concentration of salt in solution being carried to seawater dispersal, the conduit being extended to an elevation located beneath the impervious layer and above the surface area of the underground body of saline water;

continuously removing water vapor from beneath the vapor-impervious layer by pumping the water vapor upwardly through the extended conduit to the ground surface location at a rate enabling the resulting dense brine in the underground body of saline water to be simultaneously replaced by the less saline, less dense, warmer seawater due to the access of the underground body of saline water to the body of seawater and thereby causing additional water vapor to evaporate at the surface area of the underground body of saline water so as to be available in the natural underground geological structure beneath the vapor-impervious cover layer for such continuous removal;

condensing the removed water vapor at the ground surface location;

the continuous removal of water vapor being accompanied by continuous replenishment of the underground body of saline water with the seawater having access to the underground geological structure to assure dilution of the underground body of saline water and to maintain a balanced condition of salinity between it and the body of seawater;

injecting into the underground body of saline water a refrigerant fluid that is soluble in the petroleum hydrocarbon series and which is capable of entrapping water vapor and hydrocarbon constituents as the refrigerant fluid vaporizes within the underground body of saline water and comes in contact with residual petroliferous hydrocarbons to agitate the water and entrap water vapor and hydrocarbon constituents in the bubbles of refrigerant to increase the rate of water vaporization at the surface area of the underground body of saline water;

removing the vaporized refrigerant and entrapped hydrocarbon constituents along with the water vapor;

and condensing the removed hydrocarbon constituents at the ground surface location.

* * * * *